United States Patent
Garland

[15] 3,670,865
[45] June 20, 1972

[54] RECTIFYING MEANS
[72] Inventor: Carl C. Garland, Detroit, Mich.
[73] Assignee: Parke, Davis & Company, Detroit, Mich.
[22] Filed: July 23, 1970
[21] Appl. No.: 57,535

[52] U.S. Cl............................................198/33 AA, 101/37
[51] Int. Cl. ....................................B65g 47/14, B41f 17/36
[58] Field of Search...............53/166, 247; 101/37; 141/171; 193/43, 43 B; 198/33 AA, 53, 131

[56] References Cited

UNITED STATES PATENTS 3,272,118  9/1966  Ackley..........................198/33 AA X
1,403,436  1/1922  Massey....................................101/37
2,932,377  4/1960  Ashby...............................198/33 AA

*Primary Examiner*—Evon C. Blunk
*Assistant Examiner*—W. Scott Carson
*Attorney*—Robert R. Adams, David B. Ehrlinger, George M. Richards and Edward J. Gall

[57] ABSTRACT

Apparatus means are provided to rectify and convey cap-and-body pharmaceutical capsules, for printing or other work operation, from a random supply of joined capsules, thereby making for significant advantage in materials handling. For labeling purposes especially, this enables selective printing either on the cap, on the body, or on both, with the same or different legends, as desired.

7 Claims, 4 Drawing Figures

PATENTED JUN 20 1972 3,670,865

INVENTOR.
CARL C. GARLAND
BY David B. Ehrlinger
ATT'Y.

RECTIFYING MEANS

SUMMARY AND DETAILED DESCRIPTION

This invention relates to apparatus and means for rectifying pharmaceutical capsules and the like. More particularly, the invention relates to apparatus for handling joined cap-and-body capsules in a bulk supply and for delivering the same one-by-one at relatively high speed in oriented position to a work station for printing, filling or other similar operation.

By way of background, the handling of capsules in drug manufacture presents special problems because of the unique configuration which capsules have. The parts are extremely light and unwieldy and they tend to roll and to nest. Joined capsules also have similar characteristics and are top-heavy. To overcome these problems various means have been used, notable examples of which are the rectifier plate used in capsule filling, the finger supports used in filled capsule banding, etc. Unless necessary for handling, however, no attempt is ordinarily made to rectify or align the capsule, for example, with the body down and cap up. Consequently when the joined capsule is presented to the work station the positioning is left to chance as to whether the cap end or body and is foremost, uppermost, inward, etc. Examples of this practice are found in capsule printing and capsule banding. In printing, especially, the art has lacked means for printing on one end only. In other cases, however, where rectification is essential, the prior art means have been unduly expensive or inefficient.

It is therefore an object of the present invention to provide simple effective means for orienting or rectifying joined capsules.

It is also an object to provide means for rectifying capsules at high speed.

These and other objects, advantages and purposes of the invention will be seen in the following specification and accompanying drawing.

Figure 1:
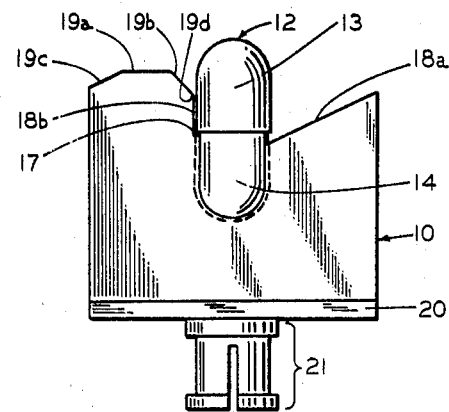
FIGS. 1 and 2 are side and top views of a preferred rectifier carrier supporting a joined capsule according to the invention.
Figure 2:
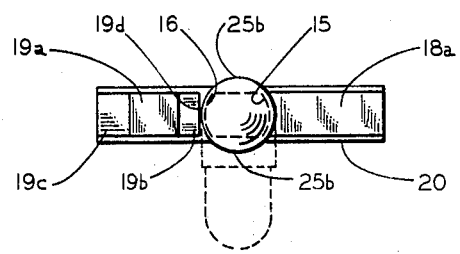
Figure 4:
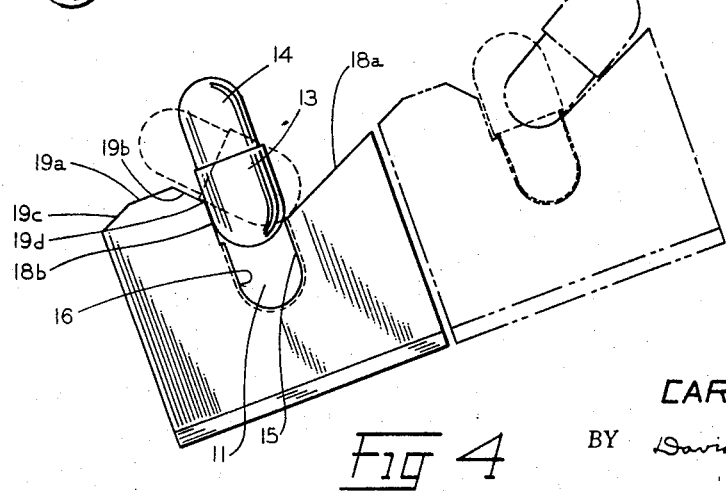
FIG. 4 is a side view in detail of a carrier of FIG. 1 illustrating the rejection of a misoriented capsule.

The carrier or rectifier block 10 illustrated in FIG. 1 is a preferred embodiment of the invention. It has an open tubular recess 11 (as seen in FIG. 4) shaped to fit a pharmaceutical capsule 12 having a telescopically matching cap 13 and body 14. The recess is generally circular in cross-section (FIG. 2) at what may be described as a leading concave surface 15 and a trailing concave surface 16, the lateral sides as well as the top being open. The trailing surface 16 joins with a setback or offset 17. The leading surface 15 merges at its upper margin with a threshold surface 18a; the trailing surface 16 extends above the offset 17 in a vertical flat 18b which continues at its upper edge to the top 19a where it forms a square corner or preferably a corner with a radius or more preferably a bevel or chamfer 19b. The top 19a also has a bevel 19c slanting at an angle which in actual operation is in line (FIG. 4) with the threshold surface 18a of the next following carrier block. In terms of machine direction or work flow, the flat 18b is rearwardly offset as indicated, the amount being such as to clear the capsule cap 13 with the capsule loaded in the recess as shown. The portion of the recess 11 on a line generally below the offset 17 and threshold surface 18a is sufficiently narrow to fit the body 14 but not the cap 13 and sufficiently deep to support the capsule and accommodate the same preferably with a portion of the body wall standing above the offset. The fit preferably is such that the body can turn or rotate freely on its length axis while mounted in the recess.

The carrier block is adapted to ride with an endless conveyor in a slotted track and is held on a constant path by means including flange 20 and advanced by chain link means into which the mounting hub 21 is removably fitted.

OPERATION

For purposes of illustration, the operation of rectifying according to the invention will be described in connection with the printing of capsules. It will be realized, however, that the invention is applicable to any of a variety of work operations such as filling, dispensing, etc., and is not limited to printing.

Figure 3:
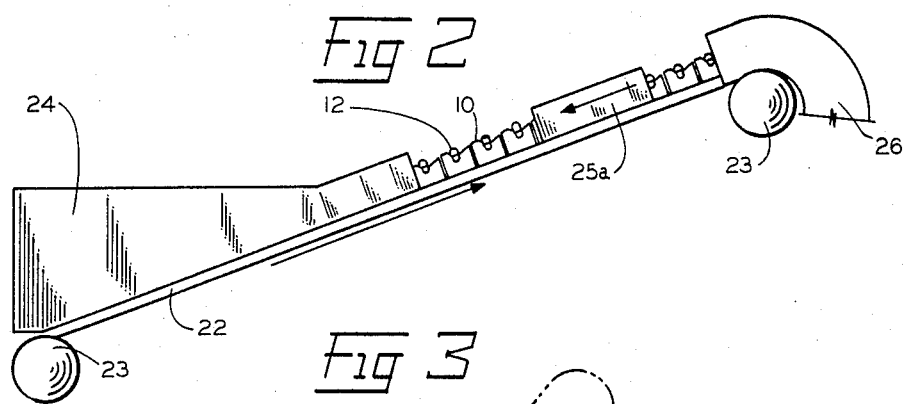
FIG. 3 is a plan view of an apparatus for the roll printing of capsules transferred by endless conveyor means.

Referring to FIG. 3, the apparatus shown has a continuous series of rectifier blocks 10 carried end-to-end on an endless conveyor chain 22 driven or supported by pulleys 23. The blocks pass smoothly at a constant rate through a slotted bed of a bin 24 containing a bulk supply of empty joined capsules of a single size. As the blocks move through the random layers of loose capsules, they have a plowing action so that individual capsules are pressed down by gravity and the weight of other capsules onto the threshold surface 18a, the flat 18b, the top 19a, the bevel 19c. This also has a funneling action, tending to drive the capsules endwise to the recess 11. Where the body end is presented downward, individual capsules become loaded one-for-one as intended into the recess and are conveyed out of the supply bin to their destination. The plowing and funneling actions are facilitated by the angle of incline (about 45°) which the blocks follow in moving up through the bed of capsules.

As indicated, the posture of any given capsule in relation to an adjacent rectifier block is a matter of chance so that the cap end, rather than the body end, may find its way to the recess 11, somewhat as illustrated in FIG. 4. In this case, the capsule cannot enter since the cap is purposely larger than the recess. When this happens, the capsule may actually ride the block temporarily in its transit through the supply bin 24. However, the dragging and pressing of other capsules typically cause the capsule to tip sideways (as shown in dotted outline, FIG. 2) or backwards (FIG. 4) so that the capsule falls off and the block is freed for entry by another capsule. The sideward deflection, surprisingly effective, is made possible by the combination of the offset 17 and the flat 18b. The backward deflection takes place without the bevel 19b but the latter is preferred. In this regard and referring to FIG. 4, when a misoriented capsule stands cap down at the recess, the edge 19d of the flat 18b constitutes a pivot means (located for contact with the sidewall preferably at the mid-point of the capsule or lower) on which the capsule can first cock back under pressure to the position illustrated in dotted outline and then move off the block in some cases to the next following block, body end first. The invention also contemplates, for this purpose, having the surfaces 18b, 19a, and 19b convexly curved rather than flat so that the deflecting action is maintained without sacrificing the mentioned funneling action.

It is found that by these means all of the capsules emerging from the capsule supply 24 are correctly oriented. Depending on the length of the supply bin, a certain percentage of the emerging blocks can be expected to be empty. This, however, is tolerable since the empty block does not interfere with the operation at the work station. In the case of printing, for example, the blocks are led between two cooperating wheels or rolls 25a which contact and press on opposite sidewalls 25b of the capsule causing the capsule to spin as it is contacted. One of the rolls has its contact face provided with peripheral ink-filled engraved indicia marks each spaced appropriately for impression on the site ordinarily occupied by the contact surface 25b (of the cap and/or body, as desired) of each advancing capsule. Thus, in the printing cycle, at the instant when the printing impression is to be made, either the capsule surface 25b is present and is printed or the block is empty. In other words, improper printing does not take place as would be the case if the block were loaded with a capsule in misoriented or cap down position. The arrangement permits significant selectivity in the work operation since each time at the selected work location it presents the same predetermined position or feature of the capsule for modification, inspection, etc., as desired.

The path of the conveyor, beyond the printing station, continues to a receiver 26 where the blocks tip and unload by gravity or are otherwise emptied (leaving the printed capsules behind) for return to the unprinted capsule supply where the cycle repeats. Equipment of the general type for conveying and printing capsules is commercially available. One such unit is the Hartnett Delta printer (R. W. Hartnett Company, Phila., Pa., U.S.A.). The unit, however, like others in the industry has no provision for rectification.

The rectifier block means 10 is preferably made of a durable, dimensionably stable plastic such as teflon or nylon, the surfaces being formed by casting, machining or other means. The configuration of the block is, of course, subject to considerable variation within the limits described above for accomplishing the purposes of the invention. As an illustration of the dimensions for a preferred block for No. 2 capsules, the bore (distance between the leading and trailing surfaces) should be approximately 0.240 inch in diameter, the chamfer 19b should be about one-sixteenth inch by 45°. The offset 17 should be about nine-sixteenths inch above the bottom of flange 20; the bore end should be a hemispherical surface on the radius (about 0.120 inch) taken from a center-line point about twenty-five sixty-fourths inch above the flange bottom. The flat 18b should be about 0.125 inch from center line. Dimensions for blocks accommodating other capsule sizes are correspondingly altered to suit the needs of each size.

While the invention in rectifier apparatus means has been described in considerable detail in the foregoing specification, it will be realized by those skilled in the art that wide variation can be made in such detail within the spirit of the invention claimed below; it is intended that the claims be interpreted to cover both the invention particularly described and any such variation.

I claim:

1. In combination with telescopically joined cap-and-body capsules of a predetermined axial length and diametrical size in which said cap is larger than and telescopes over said body,
   machine means for conveying said joined capsules in a line in correctly oriented position from a random supply of said joined capsules,
   a plurality of driven rectifier or guide means, each of which comprises a carrier having an upright tubular recess defined in terms of machine direction by leading and trailing concave surfaces for loading with the body of a capsule in a close fit and for conveying the capsule upright to a work station, the carrier having a length axis in the machine direction,
   characterized in that the tubular recess is sufficiently narrow to fit the body but not the cap so that a capsule presented to the recess in cap-down position is prevented from loading into the recess and is sufficiently deep to support the body of a capsule mounted in the recess,
   the upper portion of the trailing surface adjacent the position of the cap of a capsule in loaded position is flat instead of concave, the flat being generally perpendicular to the length axis and rearwardly offset from the trailing concave surface, the amount of offset being such as to clear the cap of a capsule in loaded position whereby a capsule presented to the recess in cap-down position is allowed to ride against the flat temporarily but is prevented from loading into the recess or nesting in a concave trailing surface and means to drive said plurality of driven rectifier or guide means through said random supply.

2. Guide means according to claim 1 comprising a rearward bevel joining the flat and the top of the guide means.

3. Guide means according to claim 2 wherein the bevel extends from the flat at an angle of approximately 45°.

4. Guide means according to claim 2 wherein the rearward bevel includes a pivot located for contact with the sidewall of a capsule presented to the recess in the cap-down position whereby a capsule in the latter position is pivotable away from the recess.

5. Guide means according to claim 2 wherein the rearward bevel includes a pivot located for contact with the sidewall of a capsule at the mid-point of the capsule or lower when such capsule is presented to the recess in the cap-down position whereby a capsule in the latter position is pivotable away from the recess.

6. Guide means according to claim 1 supporting pivot means in association with the flat located for contact with the sidewall of a capsule presented to the recess in the cap-down position whereby a capsule in the latter position is pivotable away from the recess.

7. Guide means according to claim 6 wherein the pivot means is located for contact with the sidewall of a capsule at the mid-point of the capsule or lower when such capsule is presented in the cap-down position.

* * * * *